US009769044B1

(12) United States Patent
Cirkovic et al.

(10) Patent No.: US 9,769,044 B1
(45) Date of Patent: *Sep. 19, 2017

(54) INTERNET PROTOCOL SERVICE PERFORMANCE MONITORING

(71) Applicant: Juniper Networks, Inc., Sunnyvale, CA (US)

(72) Inventors: Sasha Cirkovic, San Francisco, CA (US); Sunesh Rustagi, San Jose, CA (US); Sudhin Jacob, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 432 days.

This patent is subject to a terminal disclaimer.

(21) Appl. No.: 14/499,998

(22) Filed: Sep. 29, 2014

(51) Int. Cl.
| | |
|---|---|
| H04L 1/00 | (2006.01) |
| H04L 12/26 | (2006.01) |
| H04L 12/28 | (2006.01) |
| H04L 12/16 | (2006.01) |
| H04L 12/721 | (2013.01) |

(52) U.S. Cl.
CPC ...... H04L 43/0876 (2013.01); H04L 43/0852 (2013.01); H04L 45/66 (2013.01)

(58) Field of Classification Search
CPC . H04L 12/66; H04L 12/4641; H04L 41/0213; H04L 41/0631; H04L 41/12; H04L 41/16; H04L 41/22; H04L 43/026
See application file for complete search history.

(56) References Cited

U.S. PATENT DOCUMENTS

| | | | |
|---|---|---|---|
| 7,212,530 B1 | 5/2007 | Lim et al. | |
| 7,239,630 B1 | 7/2007 | Lim et al. | |
| 7,623,449 B2 | 11/2009 | Shabtay | |
| 7,801,974 B2 | 9/2010 | Yang et al. | |
| 7,804,766 B2 | 9/2010 | Qian et al. | |
| 7,898,965 B2 | 3/2011 | Mohan et al. | |
| 9,055,000 B1 | 6/2015 | Ghosh et al. | |
| 9,306,830 B2 | 4/2016 | Robitaille | |
| 2005/0188106 A1 | 8/2005 | Pirbhai et al. | |
| 2005/0281259 A1 | 12/2005 | Mitchell | |
| 2007/0086448 A1 | 4/2007 | Hu | |
| 2009/0129260 A1 | 5/2009 | Qian et al. | |
| 2013/0003554 A1* | 1/2013 | Aybay | H04L 43/026 370/235 |

(Continued)

OTHER PUBLICATIONS

Notice of Allowance from U.S. Appl. No. 14/696,146, mailed Nov. 4, 2016, 9 pp.

(Continued)

*Primary Examiner* — Yemane Mesfin
*Assistant Examiner* — Abdelillah Elmejjarmi
(74) *Attorney, Agent, or Firm* — Shumaker & Sieffert, P.A.

(57) ABSTRACT

In some examples, a router comprising a control unit comprising a processor, the control unit configured to receive configuration data defining a measurement endpoint for measuring performance of a layer 3 (L3) service and associating the measurement endpoint with a remote measurement endpoint of a remote router. The control unit is further configured to encapsulate, to generate a flow measurement packet, a layer 2 (L2) measurement packet in a layer 4 (L4) header and an L3 header that identify a measurement flow. The control unit is further configured to output the flow measurement packet to the remote router.

19 Claims, 5 Drawing Sheets

(56) References Cited

U.S. PATENT DOCUMENTS

| 2014/0211636 | A1 | 7/2014 | Robitaille |
| 2014/0293799 | A1* | 10/2014 | Park .................... H04W 24/08 370/242 |
| 2015/0188769 | A1 | 7/2015 | Gu |
| 2016/0294987 | A1 | 10/2016 | Tian et al. |

OTHER PUBLICATIONS

Internal Telecommunication Union Telecommunication Standardization Section (ITU-T) recommendation Y.1731, "OAM functions and mechanisms for Ethernet based networks," May 2006, 80 pgs.

Rosen et al. "BGP/MPLS IP Virtual Private Networks (VPNs)," Network Working Group, RFC 4364, Feb. 2006, 47 pgs.

Rosen et al. "BGP/MPLS VPNs," Network Working Group, RFC 2547, Mar. 1999, 25 pgs.

Office Action from U.S. Appl. No. 14/696,146, dated Aug. 25, 2016, 7 pp.

Amendment in Response to Office Action mailed Aug. 25, 2016, from U.S. Appl. No. 14/696,146, filed Sep. 22, 2016, 5 pp.

* cited by examiner

INTERNET PROTOCOL SERVICE PERFORMANCE MONITORING

TECHNICAL FIELD

This disclosure relates to computer networks and, more specifically, to monitoring computer network performance.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 networks is an Ethernet network in which end point devices (e.g., servers, printers, computers) are connected by one or more Ethernet switches or other L2 network devices. The Ethernet switches forward Ethernet frames, also referred to as L2 communications or L2 packets to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables associated with each of their physical interfaces. When forwarding an individual Ethernet frame, an ingress port of an Ethernet switch typically multicasts the Ethernet frame to all of the other physical ports of the switch unless the Ethernet switch has learned the specific physical port through which the destination MAC address devices is reachable. In this case, the Ethernet switch forwards a single copy of the Ethernet frame out the associated physical port.

Network service providers that offer L2 connectively typically enter into a service-level agreement (SLA) with their customers that defines both the services that are to be provided and a promised level of performance for the services. The performance level specifies measurable metrics such as bandwidth guarantees, up-time percentages, and the number of serviceable users. Another metric commonly defined in an SLA is frame loss performance, which is typically expressed as a ratio of the number of service frames (e.g., encapsulated L2 communications) not delivered to the total number of service frames during a particular time interval.

To monitor L2 performance metrics and verify operation, network administrators implement a process referred to as Operations, Administration and Maintenance (OAM), which generally provides the activities, tools, standards and other techniques that involve operating, administering and maintaining connectivity in the L2 computer network. One such OAM tool, referred to as OAM Frame Loss Measurement, standardizes mechanisms for loss measurement in an Ethernet computer network and is described in the Internal Telecommunication Union Telecommunication Standardization Section (ITU-T) recommendation Y.1731, "OAM functions and mechanisms for Ethernet based networks," May, 2006, which is incorporated by reference herein in its entirety. OAM Frame Loss Measurement as described in ITU-T Y.1731, Section 8, defines the Frame Loss Ratio performance metric to apply to Ethernet frames admitted at the ingress L2 flow point of an L2 connection and delivered to the egress L2 flow point of the L2 connection.

SUMMARY

In general, techniques are described for measuring the service performance of an Internet Protocol (IP) service that interconnects two or more customer networks. The techniques may be useful for network service providers offering systems that provide connectivity between multiple, geographically separate customer networks. That is, separate customer networks (or "customer network sites") may be interconnected by the service provider to provide layer 3 (L3 or "network layer") connectivity as though the customer network sites were directly connected.

In some examples, an administrator or other entity may configure service monitoring between endpoints that cooperatively offer an IP service, such as a layer 3 virtual private network (L3VPN) or IP-VPN, to interconnect customer networks coupled to the endpoints. As part of the configuration, the administrator may configure a measurement flow to transport layer 2 (L2) measurement packets between the endpoints to allow the endpoints to leverage L2 performance monitoring techniques. The measurement flow may be defined by header information, such as the 5-tuple that specifies the protocol, source IP address, destination IP address, source port, and destination port for a packet. The header information uniquely identifies flow measurement packets for the measurement flow and enables the endpoints to tunnel L2 measurement packets using the flow measurement packets to provide point-to-point (P2P) or point-to-multipoint (P2MP) connectivity for an L2 monitoring service using the measurement flow.

In some examples, the techniques may leverage the Y.1731 performance monitoring (PM) protocol, in which case actual packet count and timestamps are related for the measurement flows. In particular, elements of an IP/MPLS network that constitute the service provider network may route Y.1731 packet data units (PDUs) encapsulated in UDP/IP packets. In this way, the techniques may provide accurate and precise SLA measurement tools for IP/IP-VPN services by leveraging well-known techniques for validating L2/Ethernet services (e.g., Y.1731).

The techniques for monitoring a performance of an IP service, as described herein, may improve the ability of the service provider to verify to customers that operation of the IP service meets the performance requirements of an service-level agreement (SLA), for instance, increased accuracy for which are being driven by emerging applications and mobile deployments over IP/IP-VPN network. Furthermore, the techniques may in some cases leverage existing standards for L2/Ethernet performance monitoring and thereby short-circuit the need to develop new standards specifically for IP service monitoring.

In one example, a method comprises receiving, by a router, configuration data defining a measurement endpoint for measuring performance of a layer 3 (L3) service and associating the measurement endpoint with a remote measurement endpoint of a remote router. The method also comprises encapsulating, by the router to generate a flow measurement packet, a layer 2 (L2) measurement packet in a layer 4 (L4) header and an L3 header that identify a measurement flow. The method also comprises outputting, by the router, the flow measurement packet to the remote router.

In another example, a router comprising a control unit comprising a processor, the control unit configured to receive configuration data defining a measurement endpoint for measuring performance of a layer 3 (L3) service and associating the measurement endpoint with a remote measurement endpoint of a remote router. The control unit is further configured to encapsulate, to generate a flow measurement packet, a layer 2 (L2) measurement packet in a layer 4 (L4) header and an L3 header that identify a measurement flow. The control unit is further configured to output the flow measurement packet to the remote router.

In another example, a non-transitory computer-readable medium contains instructions. The instructions cause one or more programmable processors of a router to receive configuration data defining a measurement endpoint for measuring performance of a layer 3 (L3) service and associating the measurement endpoint with a remote measurement endpoint of a remote router; encapsulate, to generate a flow measurement packet, a layer 2 (L2) measurement packet in a layer 4 (L4) header and an L3 header that identify a measurement flow; and output the flow measurement packet to the remote router.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
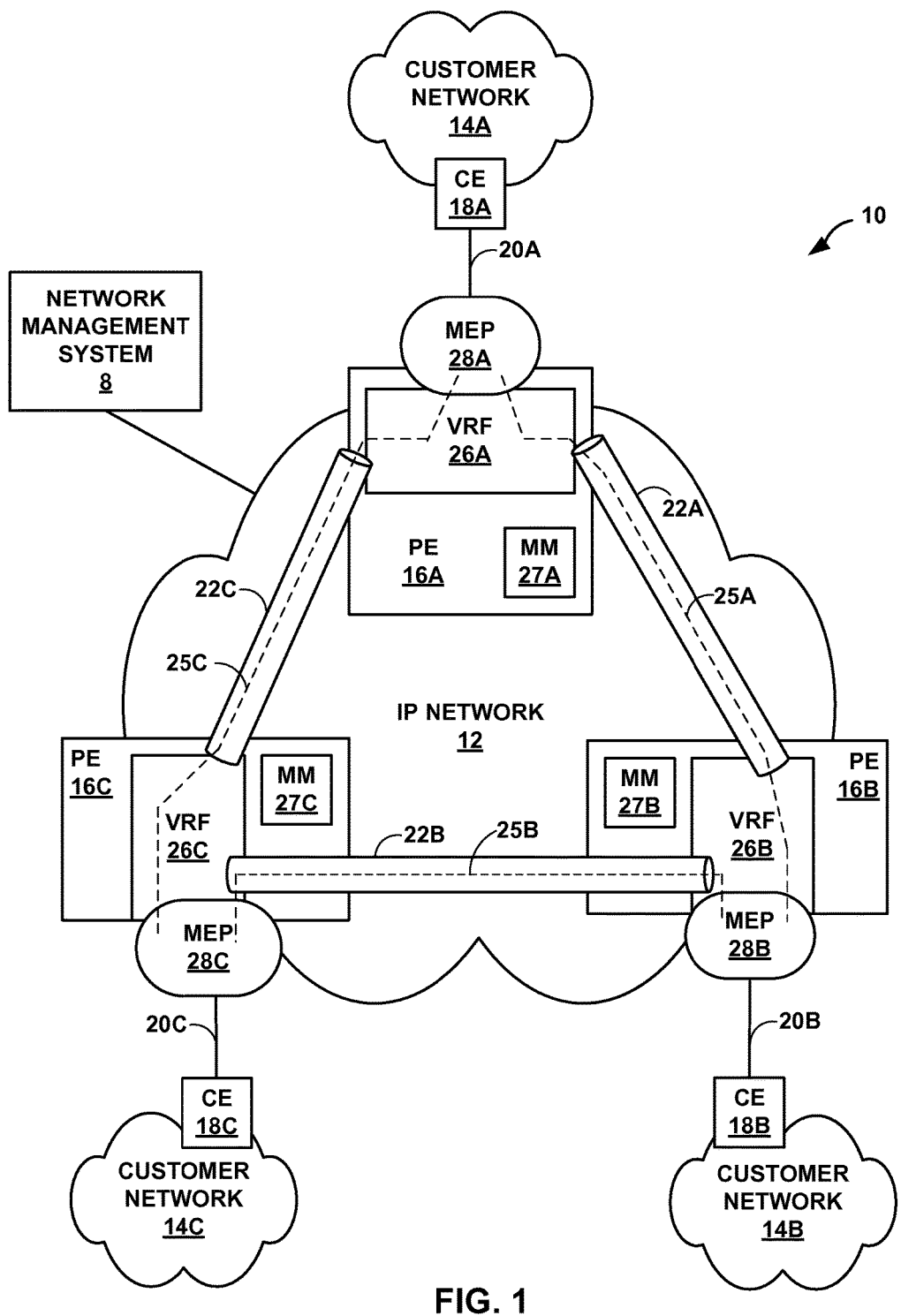
FIG. 1 is a block diagram illustrating an example network system 10 in which one or more network devices monitor the performance of service traffic for an IP service at service endpoints according to techniques described herein.

FIG. 1 is a block diagram illustrating an example network system 10 in which one or more network devices monitor the performance of service traffic for an IP service at service endpoints according to techniques described herein. As shown in FIG. 1, network system 10 includes an IP network 12 and customer networks 14A-14C ("customer networks 14"). IP network 12 may represent a public network that is owned and operated by a service provider to interconnect a plurality of edge networks, such as customer networks 14. As a result, IP network 12 may be referred to herein as a Service Provider (SP) network or, alternatively, as a "core network" in that IP network 12 acts as a core to interconnect access networks that service customer networks 14. Example service providers include Verizon Communications, Inc. or American Telephone & Telegraph (AT&T™) Company. In some examples, IP network 12 may represent a Multiprotocol Label Switching (MPLS) network.

In the illustrated instance, IP network 12 provides an IP service to transparently interconnect customer networks 14 at the IP layer (also referred to as layer 3 or the network layer) such that, from the perspective of customer networks 14, each of customer networks 14 appears to have IP connectivity with one another. The IP service operates to provide L3/IP connectivity and may be alternatively referred to as a virtual private network (VPN), an IP-VPN, a provider-provided VPN (PPVPN), or a virtual private routed network (VPRN), for example. Moreover, different IP service instances, which may include corresponding virtual routing and forwarding information (VRFs), may be maintained by PE routers 16 at a given time. In the illustrated example, VRFs 26A-26C (collectively, "VRFs 26") represent a single VRF instance for the IP service interconnecting customer networks 14. Furthermore, although illustrated as three provider edge routers 16A-16C interconnecting three customer networks 14A-14C, the techniques are applicable to other topologies. For example, a single PE router may provide an IP service to two or more customer networks 14, and so forth.

Customer networks 14 may each represent an IP network owned and operated by a large entity, such as a university, corporation, business, or other facility or enterprise. In some instances, a single large entity may own and operate two or more of customer networks 14. The entity may then contract with IP network 12 to provide a service offered by IP network 12, in order to transparently interconnect these customer networks 14 in the manner described above.

Each of customer networks 14 may operate according to a wide variety of network protocols, such as any of the 802.3X family of network protocols related to the Ethernet protocol, any of the 802.1X family of wireless networking protocols, an Internet Protocol (IP) protocol, and a Transmission Control Protocol (TCP). Moreover, one or more of customer networks 14 may comprise a Virtual Private Network (VPN), a Large Area Network (LAN), or a Wide Area Network (WAN). Although not shown in FIG. 1 for ease of illustration purposes, each of customer networks 14 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

IP network 12 may include a plurality of provider edge (PE) routers 16A-16C ("PEs 16") that reside at an edge of IP network 12. While discussed herein with respect to a particular network device, i.e., a router, PEs 16 may each represent any network device that interfaces with a network, such as one of customer networks 14, to route, switch, bridge or otherwise forward network traffic directed to or originating from the network. For example, PEs 16 may each represent, in certain instances, one or more of a switch, a hub, a bridge device, or any other network device capable of providing the IP service.

PEs 16 may implement the IP service using any of a number of different IP service technologies, such as Border Gateway Protocol/MPLS VPNs (described in Rosen and Rekhter, "BGP/MPLS VPNs," Request for Comments 2547, Network Working Group of the Internet Engineering Task Force, March 1999, which is incorporated by reference herein in its entirety), and BGP/MPLS IP VPNs (described in Rosen and Rekhter, "BGP/MPLS IP Virtual Private Networks," Request for Comments 4364, Network Working Group of the Internet Engineering Task Force, February 2006, which is incorporated by reference herein in its entirety). In some cases, PEs 16 provide a native IP service in which customer networks 14 utilize the default routing table of IP network 12.

Each of customer networks 14 may also include a respective one of a plurality of customer edge (CE) routers 18A-18C ("CEs 18") that reside at an edge of the corresponding one of customer networks 14. Like PEs 16, CEs 18, while discussed herein with respect to a particular network device, i.e., a router, may each represent any network device that interfaces with a network, such as IP network 12, to route network traffic directed to or originating from the network. For example, CEs 18 may each represent, in certain instances, one or more of a switch, a hub, a bridge device, or any other network device capable of accessing the IP service.

PEs 16 couple to respective CEs 18 of customer networks 14 via attachment circuits 20A-20C ("ACs 20"). Each of ACs 20 is a physical and/or virtual circuit attaching one of CEs 18 to one of PEs 16 and may be, for example, a Frame Relay data link connection identifier, an asynchronous transfer mode (ATM) Virtual Path Identifier (VPI)/Virtual Channel Identifier (VCI), an Ethernet port, a VLAN, a Point-to-Point Protocol (PPP) connection on a physical interface, a PPP session from an L2 Tunneling Protocol (L2TP) tunnel, or a Multiprotocol Label Switching (MPLS) Label Switched Path (LSP), a Generic Route Encapsulation (GRE) tunnel, or another interface to the IP service. Attachment circuits 20 may each comprise a direct link or an access network.

In some examples, customer networks 14 may represent elements of a mobile backhaul network in which routers and other elements of the mobile backhaul network connect cellular access points such as eNodeB's to SGWs/SGSNs and to one another via the S1 and X2 interfaces, respectively. In such examples, IP network 12 may represent a mobile network core, with PEs 16 operating as SGWs/SGSNs for the mobile service provider network.

In the illustrated example, PEs 16 use virtual routing and forwarding instances (VRFs) 26A-26C to route packets for the IP service, originated by any of customer networks 14, among the customer networks 14. More particular, tunnels 22 transport service packets for the IP service that encapsulate IP traffic among customer networks 14. PEs 16 receive such IP traffic on attachment circuits 20 and encapsulate the traffic for transport by tunnels 22 to remote PEs 16. Tunnel encapsulation headers for the IP traffic, and associated with tunnels 22, may serve to identify the IP service (e.g., an IP-VPN) to the receiving PEs 16 to enable the PEs 16 to route the traffic using the appropriate VRF, which in the illustrated example is VRFs 26.

Each of tunnels 22 may operate as a packet-switched network (PSN) tunnel that connects a pair of PEs 16. For example, customer IP traffic may be encapsulated for transport along tunnel 22A in a transport tunnel established between PEs 16A, 16B. While generally described in this document as an LSP, transport tunnels may also include GRE, L2TP, and IPsec tunnels, for example. A particular PSN tunnel may deliver IP service packets for multiple service links for different IP VPN instances, including any of tunnels 22.

An administrator of IP network 12 may configure or PEs 16 may cooperatively establish tunnels 22, and once established, PEs 16 begin emulating the IP service among customer networks 14 using tunnels 22, thus implementing an emulated service that terminates at the customer edges. Each of PEs 16 for each of the tunnels 22 endpoints may be configured with a particular pseudowire label that identifies received service packets for the IP service in the data plane. For example, PE 16A may be configured to attach pseudowire label "100" to specify tunnel 22A traffic over a PSN tunnel to PE 16B. PE 16A may be further configured with pseudowire label "200" that, when attached to service packets received in a PSN tunnel from PE 16B, identifies the traffic as tunnel 22A traffic. In this way, PEs 16 that receive labeled traffic may identify the appropriate VRF 26 with which to forward the IP service traffic among customer networks 14.

Tunnels 22 terminate at logical ports within PEs 16 that couple attachment circuits 20 to tunnels 22 and are referred to herein as "service endpoints" with respect to the IP service. Service endpoints that receive IP traffic from attachment circuits 20 are ingress service endpoints, while service endpoints that output IP traffic to attachment circuits 20 are egress service endpoints. A service endpoint, in other words, is a logical port or interface of one of PEs 16 that connects one of attachment circuits 20 to one or more tunnels 22. Two service endpoints of different ones of PEs 16 may transparently connect two attachment circuits 20 and thereby emulate a port-to-port or port-to-multiport IP service. However, service endpoints may in some contexts be understood as extending over respective attachment circuits 20 to corresponding customer networks 14.

PEs 16 may, in accordance with aspects of this disclosure, utilize the IP service to exchange bidirectional communications, called out as measurement flows 25, using tunnels 22 that PEs 16 use to implement the IP service. An administrator may configure, for PEs 16, respective maintenance association endpoints (MEPs) 28 that define performance monitoring for the IP service by binding measurement flows 25 to the MEPs 28. Each of measurement flows 25 may include measurement packets to enable loss measurement and/or delay measurement at MEPs 28 for the IP service implemented by PEs 16 for customer networks 14. MEPs 28 may be members of the same maintenance entity group (MEG) for monitoring a performance of the IP service. Although described with respect to MEPs 28 and accordingly using terminology that comports with ITU-T Y.1731, incorporated above, the techniques are not limited thereto, and MEPs 28 may represent any association between PEs 16 for the purpose of monitoring the performance of the IP service according to techniques described herein.

Each of PEs 16 includes a corresponding one of measurement modules 27A-27C (illustrated as "MMs 27"), which represent PE 16 components that initiate and process flow measurement packets to perform performance monitoring for MEPs 28. For example, MMs 27 may establish transmit and receipt counters and/or timers for MEPs 28, generate and process flow measurement packets for measurement flows 25, and report performance information to network management system 8.

Measurement flows 25 may be defined by header information, such as the 5-tuple that specifies the protocol, source IP address, destination IP address, source port, and destination port for a packet. The header information uniquely identifies flow measurement packets for one of measurement flow 25 and enables the PEs 16 to tunnel, via the encapsulated packets of measurement flows 25, L2 measurement packets to provide point-to-point (P2P) or point-to-multipoint (P2MP) connectivity for an L2 monitoring service using the measurement flows 25. Measurement flows 25 may be generated and consumed by PEs 16 without any forwarding by the PEs 16 to customer networks 14. That is, measurement flows 25 may be utilized by PEs 16 specifically for the purpose of using a particular flow to perform performance measurement for the IP service.

In examples in which MMs 27 implement loss measurement, MMs 27 exchange transmit and receipt counter values to determine packet loss during network traversal between pairs of MEPs 28. To determine packet between a local service endpoint to a remote service endpoint, for example, the local one of MMs 27 for the local MEP 28 computes packet loss for each direction of the tunnel 22 by computing differences between local and received, remote counter values for the MEPs. MMs 27 may exchange transmit and receipt counter values in loss measurement messages and loss measurement replies that represent examples of measurement packets, as described in ITU-T Y.1731, incorporated above.

In examples where MMs 27 implement delay measurement, MMs 27 exchange transmit and receipt timestamps to determine measurement packet traversal times and delays during network traversal between pairs of MEPs 28. To determine measurement packet traversal times between endpoints, the receiving MM 27 computes a traversal time based on a receipt time and a transmission timestamp included in a received measurement packet. MMs 27 may exchange transmit and receipt timestamps in delay measurement messages and delay management replies that represent examples of measurement packets, as described in ITU-T Y.1731, incorporated above.

MMs 27, according to techniques of this disclosure, exchange measurement packets as measurement flows 25 payloads, i.e., within flow packets hereinafter referred to as flow measurement packets. Each of the measurement packets represents an L2 performance monitoring packet, such as an IEEE 802.1ag Connectivity Fault Management (CFM) Protocol or ITU-T Recommendation Y.1731 (OAM) Ethernet packet. Measurement packets may have an EtherType that indicates the datagram payload is a measurement packet, e.g., EtherType=0x8902. Measurement packets may be alternatively referred to herein as measurement packet data units (PDUs).

Various techniques of this disclosure use the standard Y.1731 PM protocol where actual packet count and timestamps will be related for selected IP traffic. According to some examples of the described techniques, MMs 27 exchange Y.1731 PDUs transported via IP network 12 encapsulated in UDP/IP packets having headers defined by measurement flows 25. In this manner, various techniques of this disclosure reuse existing standards for pseudowire encapsulation (PWE) over UDP/IP PSNs and Y.1731 L2 PDUs. Thus, the techniques may be implemented in some cases without a need to change to new standards, e.g., by using existing hardware and/or software infrastructure.

In accordance with certain aspects of this disclosure, MMs 27 implement various Y.1731 OAM techniques to monitor the IP service over tunnels 22. For instance, MMs 27 may use loss measurement (LM) and delay measurement (DM) messages defined by the Y.1731 protocol to communicate packet counts and timestamps for selected IP traffic using measurement flows 25. While described herein with respect to IP network 12 for ease of illustration and discussion, it will be understood that MMs 27 may implement the techniques described herein with respect to various IP services, and that the techniques of this disclosure are not limited to being used for VPNs.

For IP traffic flows configured as one of measurement flows 25, the corresponding MMs 27 implement various traffic counting and delay monitoring techniques of this disclosure. More specifically, MMs 27 maintain packet counters for measurement PDUs belonging to each identified IP traffic flow. MMs 27 also create timestamps for each measurement PDU transported in identified IP traffic flows. Additionally, MMs 27 leverage existing Y.1731 OAM messages to communicate the packet count and timestamp information over IP network 12.

More specifically, each of MMs 27 is configured to obtain packet count data from received measurement PDUs of measurement flows 25. As described, MMs 27 implement packet counters to monitor PDU loss for L2 traffic using OAM techniques defined in the Y.1731 protocol. Additionally, MMs 27 generate timestamps to indicate the transmission time of each measurement PDU for a selected IP traffic flow. To communicate the packet counts and timestamps over IP network 12, MMs 27 may use existing loss measurement (LM) and/or delay measurement (DM) messages defined by the Y.1731 protocol. More specifically, MMs 27 may embed packet count information in a Y.1731 LM message, and the timestamp information in a Y.1731 DM message, where both LM/DM messages are examples of measurement packets.

In turn, MMs 27 may be configured, according to aspects of this disclosure, to implement pseudowire encapsulation or label encapsulation of the LM and/or DM messages, for transmission over UDP/IP PSNs. In some examples, MMs 27 may encapsulate the LM and/or DM messages in UDP/IP packets. By encapsulating the LM and/or DM messages in UDP/IP packets as described above, MMs 27 enable communication of Y.1731 OAM information over particular IP traffic flows of IP network 12. By enabling communication of OAM information over these IP traffic flows, MMs 27 use the techniques of this disclosure to implement L2 traffic monitoring techniques for various IP services (such as an IP VPN instance of IP network 12), without requiring any changes to existing hardware or software infrastructure in some cases.

Network management system 8 communicates with PEs 16 to manage and oversee PEs 16 using a device management protocol. Network management system 8 may periodically, or under direction by an administrator, request service performance data including loss and/or delay information for MEPs 28 from PEs 16. PEs 16 may perform the loss and/or delay measurement techniques described above to provide loss and delay information for the IP service associated with VRFs 26 to network management system 8 responsive to the requests or, in some instances, periodically or upon occurrence of a defined event. PEs 16 may return, in addition or alternatively to near-end and/or far-end loss data for particular MEPs 28, the appropriate transmit counter data for the MEP 28 to enable network management system 8 to compute a loss ratio.

Figure 2:
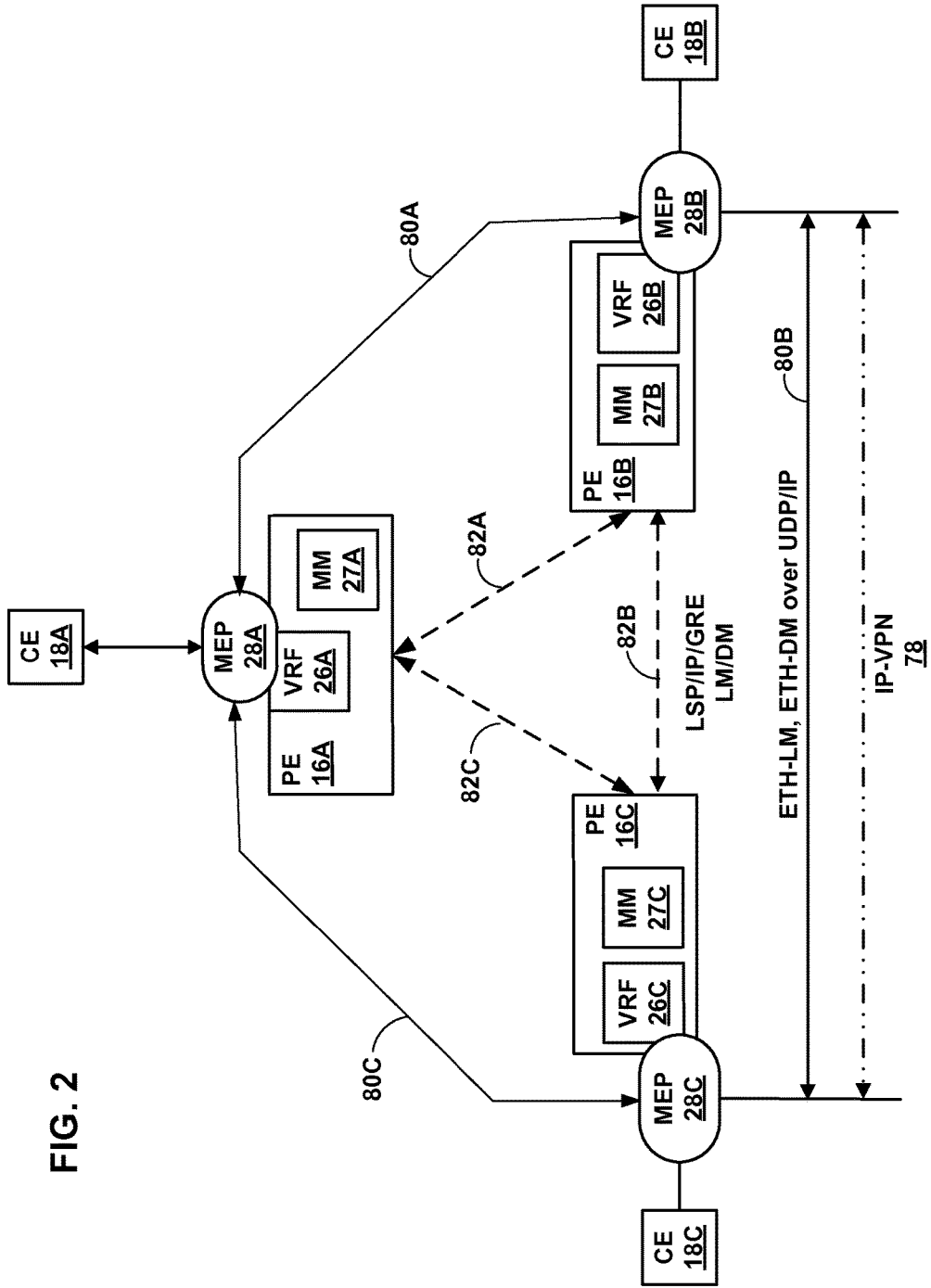
FIG. 2 is a conceptual diagram illustrating IP-VPN SLA measurement using Ethernet OAM packets, in accordance with various aspects of this disclosure.

FIG. 2 is a conceptual diagram illustrating IP-VPN SLA measurement using Ethernet OAM packets, in accordance with various aspects of this disclosure. FIG. 2 illustrates one example implementation of IP network 12 described above with respect to FIG. 1, in which PE routers 16 offer IP-VPN 78 to a customer. The IP-VPN SLA measurement using OAM packets may be implemented by various components of PEs 16, using data collected at maintenance association end points (MEPs) 28A-28C. For example, MMs 27 implementing MEPs 28C, 28B may measure selected traffic flows traversing IP-VPN 78 between PEs 16C, 16B. PEs 16 may define a particular measurement flows 80A-80C (collectively, "measurement flows 80") according to the 5-tuple based flow key described above, a subset of the 5-tuple, or in various other ways. It will be appreciated that FIG. 2 illustrates only one example implementation of the techniques described herein, and other implementations are possible as well. For example, the particular implementation of FIG. 2 utilizes IP-VPN 78 and VRFs 26. However, other example implementations of the techniques of this disclosure are possible with respect to any IP or L3 service.

Tunnels 82 of FIG. 2 represent example implementations of tunnels 22 illustrated in FIG. 1. As illustrated in FIG. 2 (with respect to tunnel 82B for purposes of example), PEs 16 may implement tunnels 82 using, e.g., label switched paths (LSPs) established using LDP/RSVP; Generic Route Encapsulation (GRE); IP-in-IP; or other tunneling techniques. More specifically, PEs 16 may exchange loss management (LM) and delay management (DM) messages defined by the Y.1731 protocol, via tunnels 82.

Measurement flows 80 of FIG. 2 represent example implementations of measurement flows 25 illustrated in FIG. 1. As illustrated in FIG. 2 (with respect to tunnel 80B for purposes of example), PEs 16 may utilize measurement flows 80 to communicate Ethernet LM messages and/or Ethernet DM messages (as defined in the Y.1731 protocol) over UDP/IP traffic flows. More specifically, as shown in the example of FIG. 2, PEs 16 may in some cases communicate measurement flows using data gathered at MEPs 28. In various examples, each of MMs 27 collects LM and DM messages (encapsulated in UDP/IP packets) at corresponding MEPs 28, for a particular IP traffic flow. In turn, MMs 27 exchange the LM and DM information, encapsulated in UDP/IP packets, over measurement flows 82. Each of measurement flows 82 correspond to a particular IP traffic flow identified using a flow key, such as a 5-tuple or a subset thereof.

Ethernet synthetic loss measurement (ETH-SLM) is an application that enables the calculation of frame loss by using synthetic frames instead of data traffic. This mechanism can be considered as a statistical sample to approximate the frame loss ratio of data traffic. Each maintenance association end point (MEP) performs frame loss measurements, which contribute to unavailable time.

A near-end frame loss specifies frame loss associated with ingress data frames and a far-end frame loss specifies frame loss associated with egress data frames. Both near-end and far-end frame loss measurements contribute to near-end severely errored seconds and far-end severely errored seconds that are used in combination to determine unavailable time. ETH-SLM is performed using synthetic loss message (SLM) and synthetic loss reply (SLR) frames. ETH-SLM facilitates each MEP to perform near-end and far-end synthetic frame loss measurements by using synthetic frames because a bidirectional service is defined as unavailable if either of the two directions is determined to be unavailable.

ITU-T Y.1731 standards defines two types of frame loss measurement, ETH-LM and ETH-SLM. MMs 27 may support either ETH-LM or ETH-SLM. For instance, MMs 27 may support single-ended ETH-SLM in which MM 27 for respective MEPs 28 send frames with the ETH-SLM request information to its peer MEP and receives frames with ETH-SLM reply information from its peer MEP to perform synthetic loss measurements. Single-ended ETH-SLM is used for proactive or on-demand OAM to perform synthetic loss measurements applicable to point-to-point Ethernet connection. This method may allow MEPs 28 to initiate and report far-end and near-end loss measurements associated with a pair of MEPs 28 that are part of the same maintenance entity group (MEG).

In addition, MMs 27 may use single-ended ETH-SLM to perform on-demand or proactive tests by initiating a finite amount of ETH-SLM frames to one or multiple MEP peers and receiving the ETH-SLM reply from the peers. The ETH-SLM frames constitute measurement packets transported via measurement flows 80 and contain the ETH-SLM information that is used to measure and report both near-end and far-end synthetic loss measurements. In this way, MMs 27 may perform service-level agreement (SLA) measurement to, e.g., monitor the bandwidth, delay, delay variation (jitter), continuity, and availability of the service.

In proactive mode, MMs 27 may operate as iterator applications to trigger SLA measurements. In such instances, MMs 27 periodically transmit measurement packets in the form of ITU-Y.1731-compliant frames for synthetic frame loss measurement. This mode differs from on-demand SLA measurement, which is user initiated. In on-demand mode, a user may trigger the measurements through a user interface such as a command-line interface of any of PEs 16. When the user triggers the ETH-SLM through the user interface, the SLM request that is generated is as per the frame formats specified by the ITU-T Y.1731 standard.

It will be appreciated that the techniques described herein may be applicable, in various scenarios, to a variety of different communications. As one example, the techniques described herein can be implemented with respect to the backhaul portion of a mobile telecommunications network. For instance, the backhaul portion of a Long-Term Evolution (LTE) telecommunications network may serve X2 traffic, which is encrypted and passed through Internet Protocol Security (IPSec) tunnels. X2 traffic (e.g., according to a corresponding SLA) is often delay sensitive. However, the performance monitoring techniques of this disclosure may be implemented in the backhaul portion of a mobile telecommunications network, to potentially eliminate the need for SLA probes. Instead, according to the techniques described herein, the backhaul portion of the mobile telecommunications network includes MEPs that are created in certain network points (e.g., "key" network points). Similarly, the techniques potentially improve the monitoring of S1 traffic (e.g., data traffic between a standardized interface between an evolved packet core and evolved node B or "eNode B") according to a corresponding SLA.

Figure 3A:
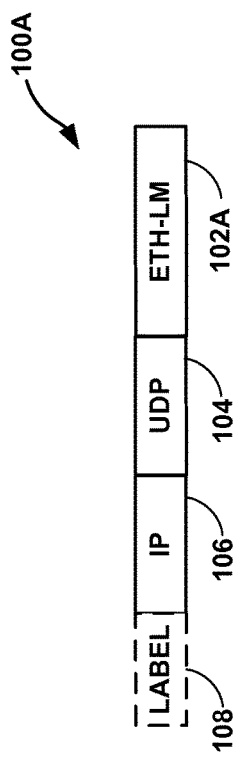
FIGS. 3A and 3B illustrate example flow measurement packets according to one or more aspects of this disclosure.
Figure 3B:
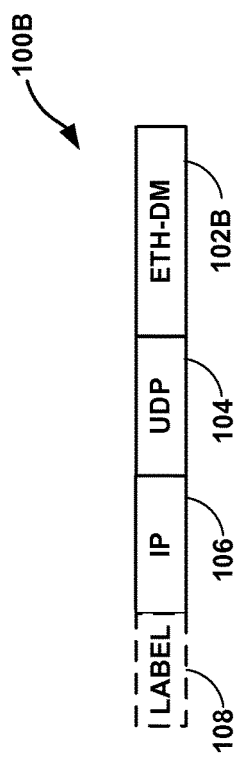

FIGS. 3A and 3B illustrate example flow measurement packets 100A and 100B provided by one or more aspects of this disclosure. Each of flow measurement packets 100A and 100B can be transported between MEPs 28C, 28B illustrated in FIGS. 1 and 2, to implement various performance monitoring techniques described herein. In the example of FIG. 3A, flow measurement packet 100A includes Ethernet loss measurement (ETH-LM) payload 102A that is an example of an L2 measurement packet. As illustrated in FIG. 3A, LM payload 102A is encapsulated with headers to form flow measurement packet 100A. Flow measurement packet 100A includes UDP header 104, IP header 106 and, in some cases, LSP label ("Label") 108. The optional nature of Label 108 is illustrated in FIG. 3A using dashed-line borders. In various examples, ETH-LM payload 102A includes OAM data defined, in this example of a measurement packet, by the standard Y.1731 protocol, and indicates one or more frame loss statistics. More specifically, ETH-LM payload 102A indicates frame loss (or PDU loss) measurement statistics with respect to selected traffic flows traversing IP network 12 between PEs 16. As described, PEs 16 may encapsulate ETH-LM payload 102A using UDP header 104, IP header 106 to implement Y.1731 OAM functionalities to track L2 traffic at the service endpoints. More specifically, by encapsulating ETH-LM payload 102A in flow measurement packet 100A, PEs 16 perform one or more techniques of this disclosure to implement PDU loss measurement within IP communications over IP network 12.

In various examples, PEs 16 use ETH-LM payload 102A to communicate an actual packet count value associated with flow measurement packet 100A. According some such examples, PEs 16 generates the packet count to indicate a sequence number of flow measurement packet 100A within a particular IP traffic flow. By including the packet count value in ETH-LM payload 102A, the sending PE 16 indicates a number of packets that were generated and/or transmitted prior to flow measurement packet 100A within the given traffic flow. In turn, the receiving PE 16 uses the packet count value of ETH-LM payload 102A to determine the number of packets that the receiving PE 16 should have received in the given traffic flow, prior to receiving flow measurement packet 100A. For instance, the receiving PE 16 may determine that the receiving PE 16 should have received one packet fewer than the packet count value of ETH-LM payload 102A. If the receiving PE 16 detects a discrepancy between the packet count of ETH-LM payload 102A (decremented by one) and the actual number of packets received prior to flow measurement packet 100A, the receiving PE 16 determines PDU loss in the traffic flow. Optionally, the receiving PE 16 may report the PDU loss (and in some cases, a total number of lost PDUs) back to the sending PE 16. In this manner, PEs 16 use the packet count value included in ETH-LM payload 102A to determine packet loss, using a particular measurement flow identified by headers 104, 106, 108. In this manner, the structure of flow measurement packet 100A enables PEs 16 to reuse or otherwise leverage existing PDU loss management mechanisms defined by the Y.1731 protocol to monitor L2 traffic flows. As such, PEs 16 may use the structure of flow measurement packet 100A to implement Y.1731 OAM functionalities for IP traffic without requiring any changes to existing hardware or software infrastructure.

FIG. 3B illustrates flow measurement packet 100B, which is an alternative implementation of flow measurement packet 100A described with respect to FIG. 3A. Flow measurement packet 100AB includes Ethernet delay measurement (ETH-DM) payload 102B. In various examples, PEs 16 use ETH-DM payload 102B to monitor PDU delay with respect to particular L2 traffic flows. In instances where PEs 16 transmit flow measurement packet 100B, the sending PE 16 is configured to embed a timestamp in ETH-DM payload 102B. For example, the sending PE 16 generates a timestamp corresponding to the time at which the sending PE 16 transmits measurement packet 100B. In turn, the receiving PE 16 compares the timestamp of ETH-DM payload 102B to the time at which flow measurement packet 100B is received. Based on the comparison of the timestamp included in ETH-DM payload 102B to the receipt time of flow measurement packet 100B, the receiving PE 16 determines the time elapsed, or "delay," with respect to receiving flow measurement packet 100B. More specifically, the receiving PE 16 uses the calculated delay to determine the transit time of flow measurement packet 100B in an IP traffic flow over IP network 12.

In some examples, the receiving PE 16 is configured to edit ETH-DM payload 102B, to include a receipt timestamp indicating a time at which flow measurement packet 100B was received. In turn, the receiving PE 16 may transmit the updated version of flow measurement packet 100B (which includes the receipt timestamp in ETH-DM payload 102B) back to the sending PE 16. In this manner, the receiving PE 16 enables the sending PE 16 to monitor PDU delay in the IP traffic flow over IP network 12 for the IP service, using a particular measurement flow identified by headers 104, 106, 108. Using the timestamps embedded in ETH-payload 102B of flow measurement packet 100B, PEs 16 may implement Y.1731 delay measurement for IP traffic flows over IP network 12, in accordance with one or more aspects of this disclosure.

Figure 4:
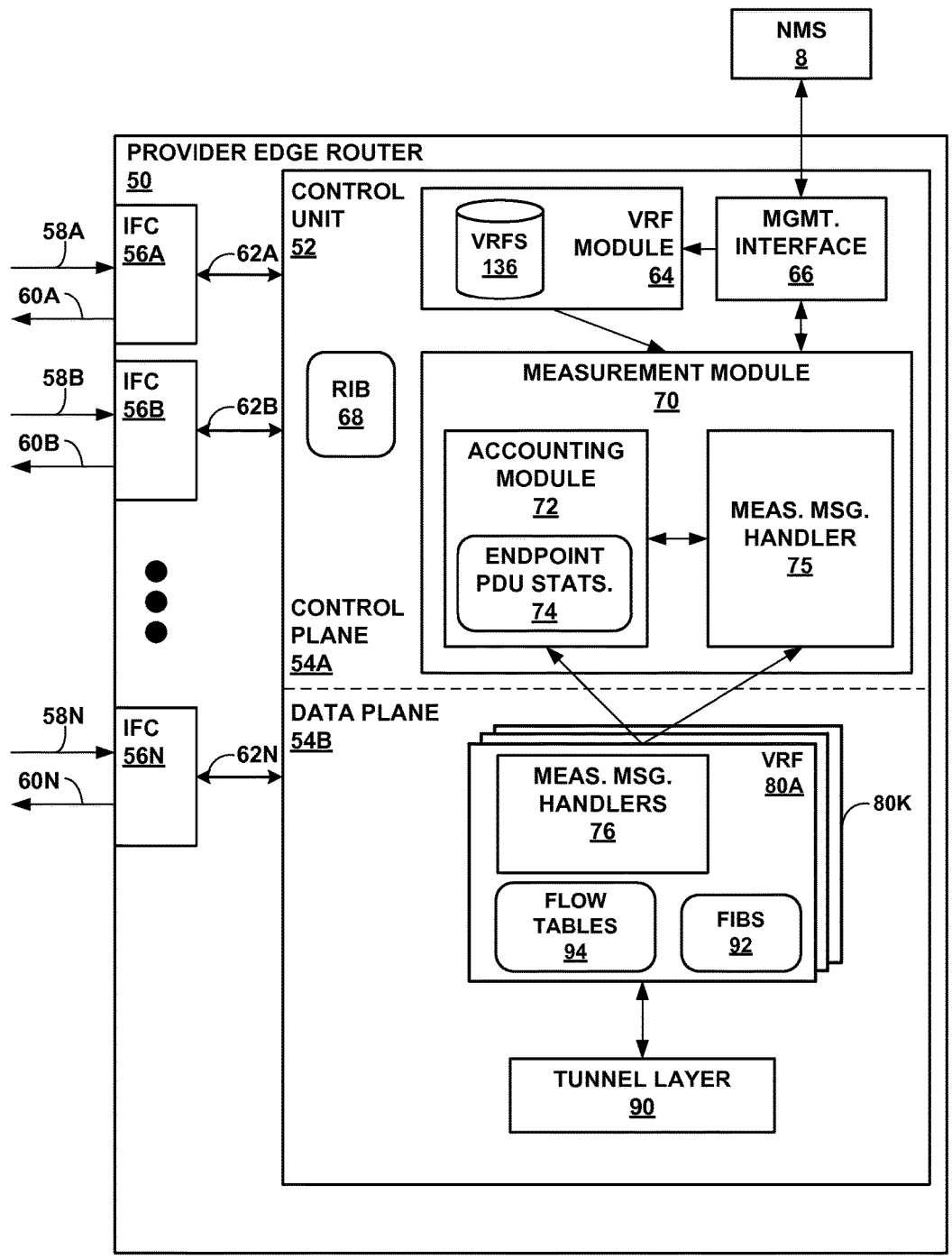
FIG. 4 is a block diagram illustrating example provider edge router that includes endpoints for an IP service provided by an IP-VPN and performs loss and/or delay measurement according to techniques described in this disclosure.

FIG. 4 is a block diagram illustrating example provider edge router 50 ("router 50") that includes endpoints for an IP service provided by an IP-VPN and performs loss and/or delay measurement according to techniques described in this disclosure. Router 50 is one example implementation of any of PEs 16 illustrated in each of FIGS. 1 and 2. Reference to a VPN instance hereinafter may refer to a VPN instance that is an IP-VPN instance. For purposes of illustration, router 50 may be described below within the context of an exemplary network system 10 of FIG. 1 that implements tunnels 22 and may represent any one of PEs 16. Moreover, while described with respect to a particular network device, e.g., a router, the techniques may be implemented by any network device that may operate as a service endpoint. The techniques should therefore not be limited to the exemplary embodiments described in this disclosure.

Router 50 includes a control unit 52 and interface cards 56A-56N ("IFCs 56") coupled to control unit 52 via internal links 62A-62N. Control unit 52 may include one or more processors (not shown in FIG. 4) that execute software instructions, such as those used to define a software or computer program, stored to a computer-readable storage medium (again, not shown in FIG. 4), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 52 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 52 is divided into two logical or physical "planes" to include a first control or routing plane 54A and a second data (or forwarding) plane 54B. That is, control unit 52 implements two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 54A of control unit 52 executes the routing functionality of router 50. In this respect, control plane 54A represents hardware or a combination of hardware and software of control unit 52 that implements routing protocols (not shown in FIG. 4) by which routing information stored in routing information base 68 ("RIB 68") may be determined. RIB 68 may include information defining a topology of a network, such as SP network 12. Control plane 54A may resolve the topology defined by routing information in RIB 68 to select or determine one or more routes through the network. Control plane 54A may then update data plane 54B with these routes, where data plane 54B maintains these routes as forwarding information base (FIB) 92. Forwarding or data plane 54B represents hardware or a combination of hardware and software of control unit 52 that forwards network traffic in accordance with FIB 92.

Control plane 54A further comprises management interface 66 (illustrated as "mgmt. interface 66") by which network management system 8 (illustrated as "NMS 8"), or in some instances an administrator using a command line or graphical user interface, configures in VRF module 64, one or more VRFs 136 for a network to interconnect combinations of customer networks into a single IP domain. For example, network management system 8 may configure router 50 as a participant in a particular VPN instance having one or more associated VPN identifiers. VRF module 64 may perform auto-discovery or other techniques to determine additional PE routers or MTUs participating in a VPLS instance and additionally performing signaling to establish a full mesh of pseudowires between PE 50 and each of the additional PE routers. In the case of an H-VPLS instance or mobile backhaul, VRF module 64 may perform signaling to establish one or more spokes and/or one or more hub links with one or more other MTUs and/or routers. VRF module 64 may execute Label Distribution Protocol (LDP)- and/or Border Gateway Protocol (BGP)-based techniques to perform the auto-discovery and signaling.

As shown, control plane 54A also includes measurement module 70. Measurement module 70 implements one or more of the IP-VPN SLA functionalities described herein. In turn, measurement module 70 includes accounting module 72 and measurement message handler 75. Accounting module 72 implements various techniques of this disclosure with respect to obtaining, maintaining, and processing various Ethernet OAM statistics (as provided by the Y.1731 protocol), with respect to IP communications. In the example of FIG. 4, accounting module 72 includes endpoint PDU statistics 74. In various examples, endpoint PDU statistics 74 may include packet counters and timestamps extracted from encapsulated OAM messages received from data plane 54B. Measurement module 70 may represent an example instance of MMs 27 of FIG. 1 or 2.

Measurement message handler 75 of control plane 54A processes OAM messages received for measured IP traffic flows received from data plane 54B. In various instances, measurement message handler 75 is configured to receive OAM information for selected (e.g., "measured") IP traffic flows. In turn, measurement message handler 75 relays the OAM information to accounting module 72, which populates endpoint PDU statistics 74 with the received OAM data.

Data plane 54B provides high-speed forwarding of network traffic received by interface cards 56 via inbound links 58A-58N. VRFs 80A-80K (collectively, "VRFs 80") and tunnel layer 90 of data plane 54B process and forwards received network traffic associated with VPN instances in which router 50 participates in accordance with FIB 92 and flow tables 82. Each of VRFs 80 and tunnel layer 90 represents components of data plane 54B to implement the respective functionalities included in the techniques described herein.

Tunnel layer 90 provides tunneling services over a packet-switched network to additional routers participating in one or more VPN instances. In some examples, tunnels may carry one or more pseudowires. VRF module 64 may perform setup, maintenance, and tear-down signaling for tunnels of the VPN instances. Additionally, VRF module 64 is configured to install, maintain, and manage VRFs 80 illustrated in data plane 54B. Tunnels implemented by tunnel layer 90 may include LSPs as well as GRE, L2TP, and IPsec tunnels. Tunnel layer 90 receives outbound IP traffic flows traffic and a specified tunnel identifier and outputs the traffic in accordance with the specified tunnel.

Data plane 54B includes multiple VRFs 80 for corresponding virtual networks, such as IP-VPNs. VRFs 80 include corresponding forwarding information bases (FIBs) 92A-92K (collectively, "FIBs 92"), flow tables 126A-126K (collectively, "flow tables 126"), and measurement message handlers 76A-76K ("measurement message handlers 76"). Although illustrated as separate data structures, flow tables 94 may in some instances be logical tables implemented as a single table or other associative data structure in which entries for respective flow tables 94 are identifiable by the virtual network identifier (e.g., an MPLS label)). FIBs 92 include lookup tables that map destination addresses to destination next hops. The destination addresses may include layer 3 network prefixes or layer 2 MAC addresses. Flow tables 94 enable application of forwarding policies to flows. Each of flow tables 94 includes flow table entries that each match one or more flows that may traverse data plane 54B and include a forwarding policy for application to matching flows. For example, data plane 54B attempts to match packets processed by any of VRFs 80 to one of the flow table entries of the corresponding flow table 94. If a matching flow table entry exists for a given packet, data plane 54B applies the flow actions specified in a policy to the packet. This may be referred to as "fast-path" packet processing. If a matching flow table entry does not exist for the packet, the packet may represent an initial packet for a new packet flow and data plane 54B may request VRF module 64 to install a flow table entry in the flow table for the new packet flow.

Each of VRFs 80 identify particular IP traffic flows using the corresponding flow table 94. More specifically, VRFs 80 identify IP traffic flows by matching an incoming packet's UDP and IP header information (such as UDP header 104 and IP header 106 illustrated in FIGS. 3A & 3B), with known UDP and IP header information included in flow tables 94. In instances where an incoming packet also includes an LSP label (e.g., optional label 108 of FIGS. 3A & 3B), the LSP label may identify to data plane 54B the VRF 80 with which to process the label-encapsulated packet.

If VRFs 80 determine that a particular IP traffic flow is a measurement flow (e.g. such as one of measurement flows 25 of FIG. 1), the corresponding measurement message handler 76 is configured to extract Y.1731 OAM information encapsulated in certain UDP/IP packets of the measurement flow. More specifically, measurement message handlers 76 extract the OAM information from measurement packets that are included in each measurement flow. Examples of measurement packets include flow measurement packets 100A and 100B of FIGS. 3A & 3B. As described with respect to flow measurement packets 100A and 100B, measurement message handlers 76 may extract either Y.1731 loss measurement (LM) or Y.1731 delay measurement (DM) information from the payloads of the received measurement packets, depending on the particular type of Y.1731 OAM message that is encapsulated in the received measurement (UDP/IP) packet. Again, such techniques are similarly applicable to other forms of L2-based performance monitoring, such as CFM.

Measurement message handlers 76 are configured to extract (or alternatively, "decapsulate") the payload of a measurement packet, to obtain the Y.1731 LM or DM message pertaining to the measured IP flow. By performing the extraction in data plane 54B (i.e., by measurement message handlers 76 of VRFs 80), router 50 implements the techniques of this disclosure in a manner that potentially conserves computing resources and processing time. Measurement message handlers 76 provide the extracted OAM messages to measurement message handler 75 of control plane 54A, and to accounting module 72 of control plane 54A. Based on the extracted OAM messages received from measurement message handlers 76, accounting module 72 stores the contents of the extracted OAM messages (e.g., packet counter values and/or timestamps), to endpoint PDU statistics 74. In some examples, accounting module 72 provides one or more of endpoint PDU statistics 74 to measurement message handler 75 of control plane 54A.

Additionally, measurement message handler 75 of control plane 54A may process endpoint PDU statistics 74 received from accounting module 72 to determine PDU loss (if any), and/or PDU delay with respect to communications received via the measurement flows. For instance, in the case of an Ethernet LM payload received from accounting module 72, measurement message handler 75 determines whether the packet count value of the LM message matches the total number of packets (either including or excluding measurement packets, in various examples) to determine whether any PDUs, such as measurement packets for ETH-SLM, have been lost in the measurement flow. If measurement message handler 75 detects a discrepancy between the number of packets received and the packet count value received from accounting module 72, measurement message handler 75 determines PDU loss based on the discrepancy.

Similarly, measurement message handler 75 compares the transmission timestamp of a DM message, such as a measurement packet for ETH-DM, received from accounting module 72 to a receipt time of the encapsulated DM message in data plane 54B. Based on the difference between the transmission timestamp and the receipt time, measurement message handler 75 determines the transit time (or delay) of the measurement packet over the measured IP flow.

In some examples, measurement message handler 75 may communicate the PDU loss value (e.g., '0' in case of no PDU loss) and/or the calculated delay times, to VRFs 80. By communicating the PDU loss value and/or the delay times to VRFs 80, measurement message handler 75 enables various components included in data plane 54B to communicate the PDU loss and/or delay time information back to the transmitting router. In this manner, various components of router 50, such as measurement message handler 75 of control plane 54A, may utilize techniques of this disclosure to implement bidirectional OAM communication over measured IP flows, using UDP/IP packets.

In some embodiments, aspects of data plane 54B are distributed to a number of distributed forwarding units, such as packet forwarding engines, each associated with a different one or more IFCs 56. In these embodiments, LM PDU handler 86 may be distributed to the distributed forwarding units to enable high-speed shim header attachment and identification and loss measurement message/loss measurement reply filtering within the data plane.

Figure 5:
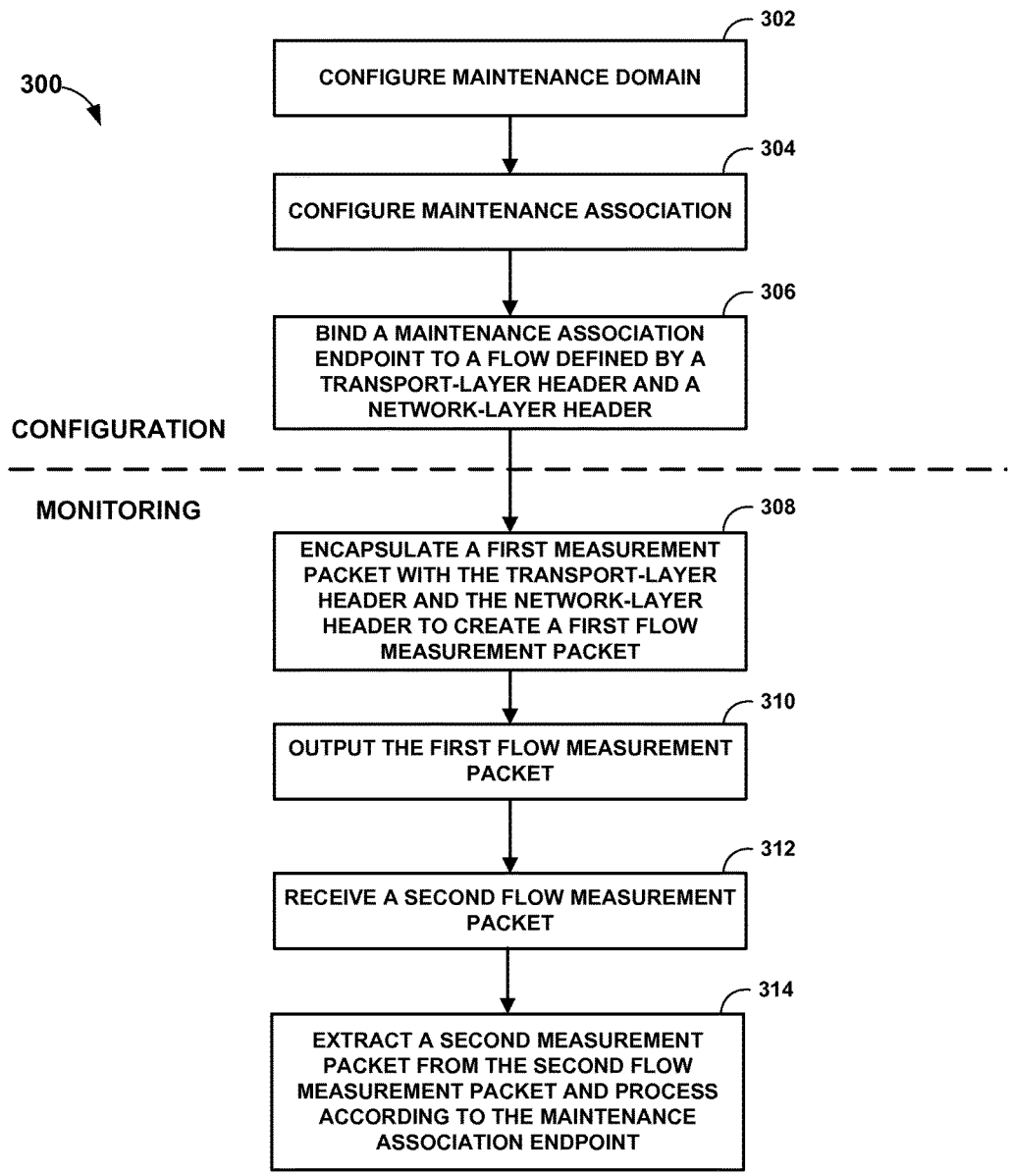
FIG. 5 is a flowchart illustrating an example process by which a router implements one or more techniques of this disclosure to perform performance monitoring according to techniques described herein.

FIG. 5 is a flowchart illustrating an example process 300 by which a router implements one or more techniques of this disclosure to perform performance monitoring according to techniques described herein. While process 300 may be performed by various devices in accordance with aspects of this disclosure, for ease of discussion and illustration purposes only, process 300 is described herein with respect to router 50 illustrated in FIG. 4. As shown, process 300 is divided into configuration and monitoring stages.

Process 300 may begin in the configuration stage, when an administrator configures a maintenance domain for one of VRFs 136 (302). For example, the configuration may represent the maintenance domain based on operational and/or contractual boundaries, such as provisions of an SLA. Additionally, the administrator may configure a maintenance association (304). As an example, the configuration may define the maintenance association based on a set of maintenance endpoints (MEPs) positioned at the edge of the maintenance domain. VRF module 64 may bind a MEP to a flow defined by a transport-layer header and a network-layer header (306). For instance, VRF module 64 may define a measurement flow using UDP header 104 and IP header 106 illustrated in FIGS. 3A and 3B. Additionally, router 50 may bind a MEP (e.g., one of MEPs 28 illustrated in FIG. 1) to the identified flow. By binding the MEP to the flow, VRF module 64 may finish the configuration stage of process 300.

The monitoring stage of process 300 may begin when measurement module 70 encapsulates a first measurement packet with the transport-layer header and the network-layer header to create a first flow measurement packet (308). For instance, measurement module 70 may encapsulate one of ETH-LM payload 102A or ETH-DM payload 102B in UDP header 104 and IP header 106, to form flow measurement packet 100A or 100B, respectively. In turn, measurement module 70 may push the first flow measurement packet (e.g., flow measurement packet 100A or 100B) to data plane 54B, and VRFs 80 may output the first flow measurement packet (310). For instance, VRFs 80 may output the first flow measurement packet using tunnel layer 90.

Additionally, VRFs 80 may receive a second flow measurement packet (312). For instance, the second flow measurement packet may be a loss measurement packet, such as flow measurement packet 100A of FIG. 3A, or a delay measurement packet, such as flow measurement packet 100B of FIG. 3B. In turn, measurement message handlers 76 may extract a second measurement packet (e.g., in the form of a Y.1731 LM or Y.1731 DM message) from the received second flow measurement packet and process the second measurement packet according to the MEP (314). For instance, the extracted measurement packet may be encapsulated in the form of ETH-LM payload 102A or ETH-DM payload 102B. In turn, measurement message handlers 76 may forward the extracted second measurement packet to measurement module 70. Once received by measurement module 70, accounting module 72 may store the contents of the extracted measurement packet (e.g., a packet count or a transmission timestamp) to endpoint PDU statistics 74. In turn, measurement message handler 75 of measurement module 70 may determine PDU loss (if any), and packet transit time (or delay), based on endpoint PDU statistics 74.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage medium" refers to physical storage media, (i.e., non-transitory media) and not signals, carrier waves, or other transient media.

Various embodiments have been described. These and other embodiments are within the scope of the following claims.

What is claimed is:

1. A method comprising:
   receiving, by a router, configuration data defining a measurement endpoint for measuring performance of a layer 3 (L3) service and associating the measurement endpoint with a remote measurement endpoint of a remote router;
   encapsulating, by the router to generate a first flow measurement packet, a first layer 2 (L2) measurement packet in a first layer 4 (L4) header and a first L3 header that identify a measurement flow;
   outputting, by the router, the first flow measurement packet to the remote router;
   receiving, by the router, a second flow measurement packet that includes a second L2 measurement packet encapsulated in a second L4 header and a second L3 header, wherein the second flow measurement packet includes a metric associated with the measurement flow;
   extracting the metric from the second flow measurement packet; and
   determining a performance statistic for the measurement flow based at least on the extracted metric.

2. The method of claim 1, wherein the first L2 measurement packet comprises a Y.1731 loss measurement (LM) packet data unit (PDU) and the measurement endpoint comprises a Y.1731 maintenance association endpoint.

3. The method of claim 2, wherein the Y.1731 LM PDU comprises a packet count value.

4. The method of claim 3, wherein the packet count value indicates a total number of packets transmitted for the measurement flow.

5. The method of claim 1, wherein the first L2 measurement packet comprises a Y.1731 delay measurement (DM) packet data unit (PDU) and the measurement endpoint comprises a Y.1731 maintenance association endpoint.

6. The method of claim 5, wherein the Y.1731 DM PDU comprises a transmission timestamp.

7. The method of claim 1, wherein each of the first L4 header and the second L4 header comprises a User Data Protocol (UDP) header, and wherein each of the first L3 header and the second L3 header comprises an Internet Protocol (IP) header.

8. The method of claim 1,
   wherein the metric comprises a packet count associated with the measurement flow, and
   wherein determining the performance statistic comprises comparing the packet count to an actual received packet count associated with the measurement flow.

9. The method of claim 1,
   wherein the metric comprises a transmission timestamp associated with the second flow measurement packet, and
   wherein determining the performance statistic comprises comparing the transmission timestamp to a receipt time associated with the second flow measurement packet.

10. A router comprising:
    a control unit comprising a processor and a memory, the control unit configured to:
    receive configuration data defining a measurement endpoint for measuring performance of a layer 3 (L3) service and associating the measurement endpoint with a remote measurement endpoint of a remote router;
    encapsulate, to generate a first flow measurement packet, a first layer 2 (L2) measurement packet in a first layer 4 (L4) header and a first L3 header that identify a measurement flow;
    output the first flow measurement packet to the remote router;
    receive a second flow measurement packet that includes a second L2 measurement packet encapsulated in a second L4 header and a second L3 header, wherein the second flow measurement packet includes a metric associated with the measurement flow;
    extract the metric from the second flow measurement packet; and
    determine a performance statistic for the measurement flow based at least on the extracted metric.

11. The router of claim 10, wherein the first L2 measurement packet comprises a Y.1731 loss measurement (LM) packet data unit (PDU) and the measurement endpoint comprises a Y.1731 maintenance association endpoint.

12. The router of claim 11, wherein the Y.1731 LM PDU comprises a packet count value.

13. The router of claim 12, wherein the packet count value indicates a total number of packets transmitted for the measurement flow.

14. The router of claim 10, wherein the first L2 measurement packet comprises a Y.1731 delay measurement (DM) packet data unit (PDU), and wherein the measurement endpoint comprises a Y.1731 maintenance association endpoint.

15. The router of claim 10, wherein each of the first L4 header and the second L4 header comprises a User Data Protocol (UDP) header, and wherein each of the first L3 header and the second L3 header comprises an Internet Protocol (IP) header.

16. The router of claim 14, wherein the Y.1731 DM PDU comprises a transmission timestamp.

17. The router of claim 10,
    wherein the metric comprises a packet count associated with the measurement flow, and wherein, to determine the performance statistic, the control unit is configured to compare the packet count to an actual received packet count associated with the measurement flow.

18. The router of claim 10,
wherein the metric comprises a transmission timestamp associated with the second flow measurement packet, and
wherein, to determine the performance statistic, the control unit is configured to compare the transmission timestamp to a receipt time associated with the second flow measurement packet.

19. A non-transitory computer-readable storage medium encoded with instructions that, when executed, cause one or more processors of a router to:
receive configuration data defining a measurement endpoint for measuring performance of a layer 3 (L3) service and associating the measurement endpoint with a remote measurement endpoint of a remote router;
encapsulate, to generate a first flow measurement packet, a first layer 2 (L2) measurement packet in a first layer 4 (L4) header and a first L3 header that identify a measurement flow;
output the first flow measurement packet to the remote router;
receive a second flow measurement packet that includes a second L2 measurement packet encapsulated in a second L4 header and a second L3 header, wherein the second flow measurement packet includes a metric associated with the measurement flow;
extract the metric from the second flow measurement packet; and
determine a performance statistic for the measurement flow based at least on the extracted metric.

\* \* \* \* \*